UNITED STATES PATENT OFFICE.

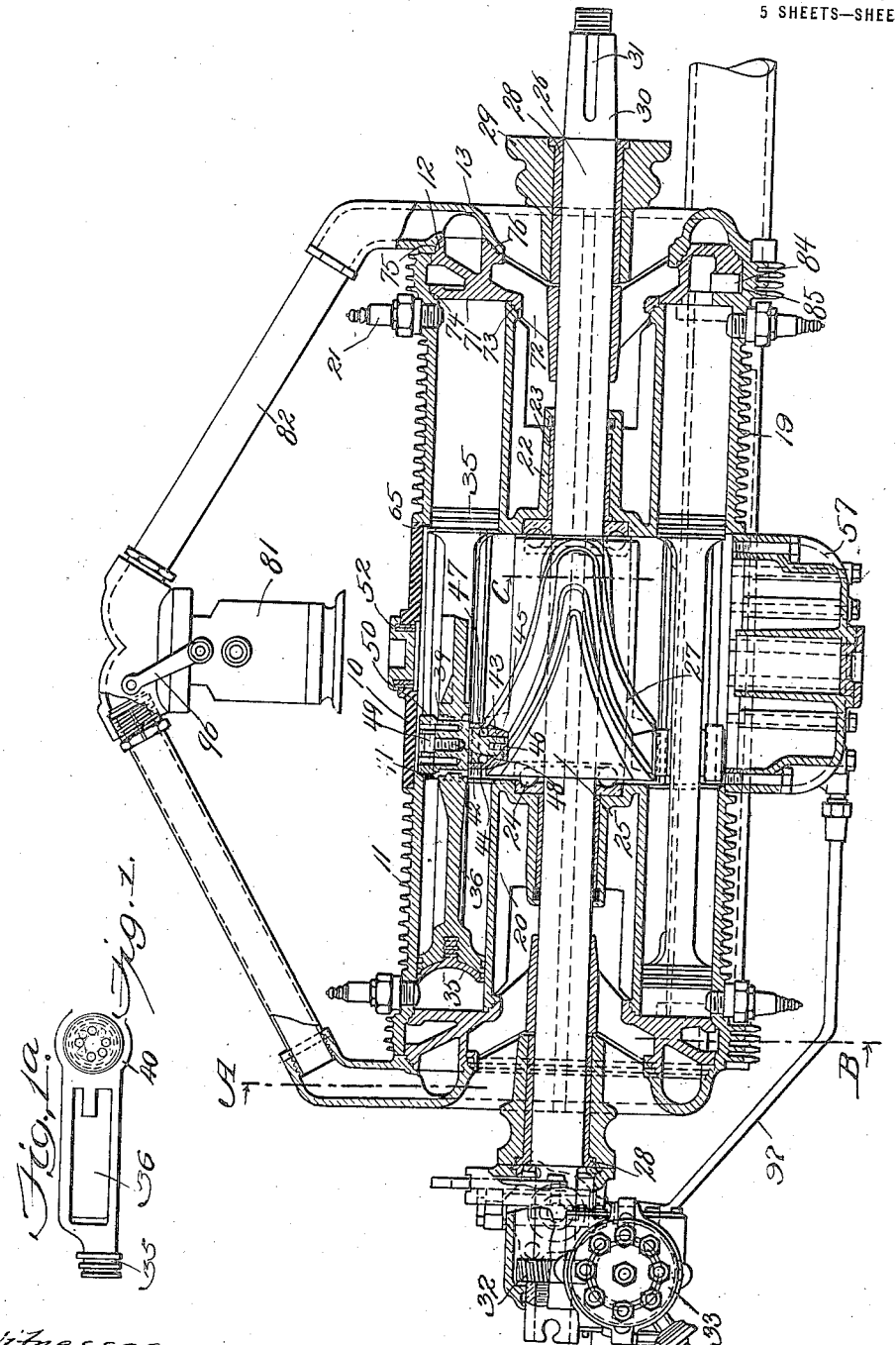

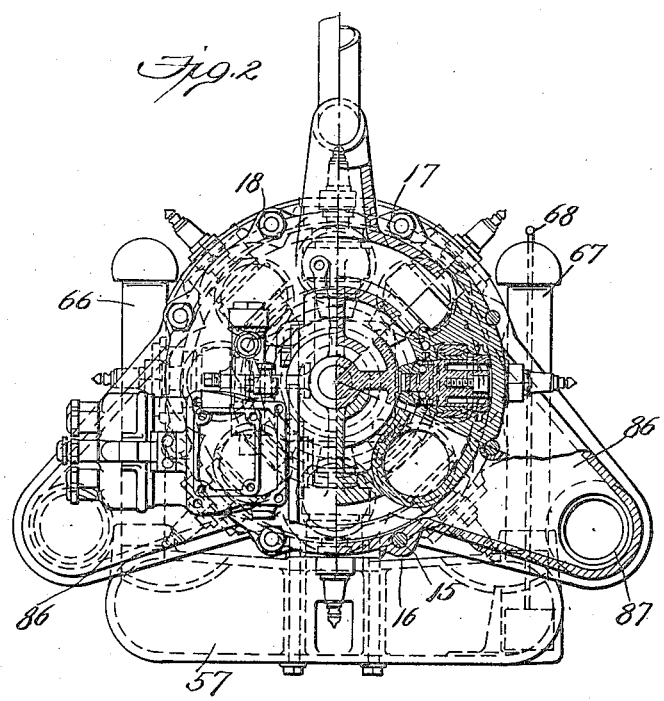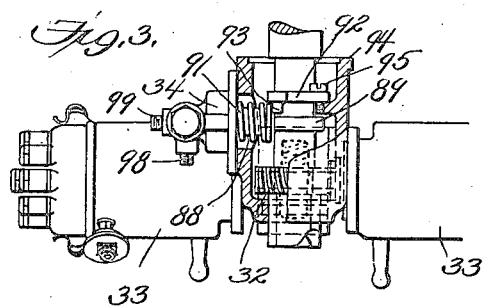

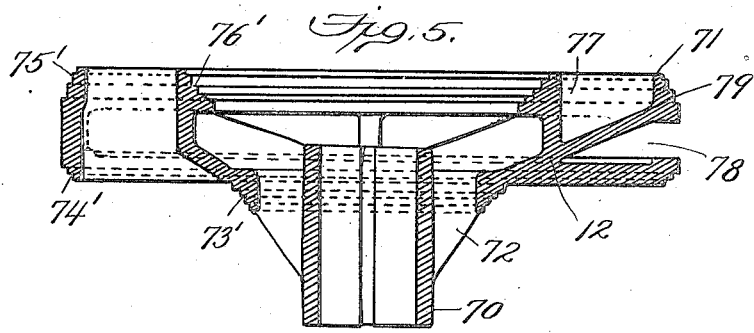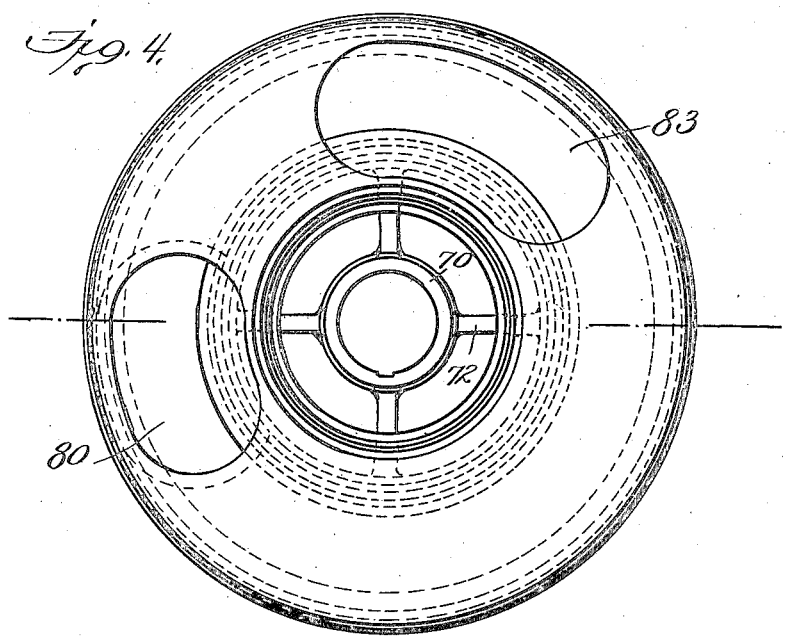

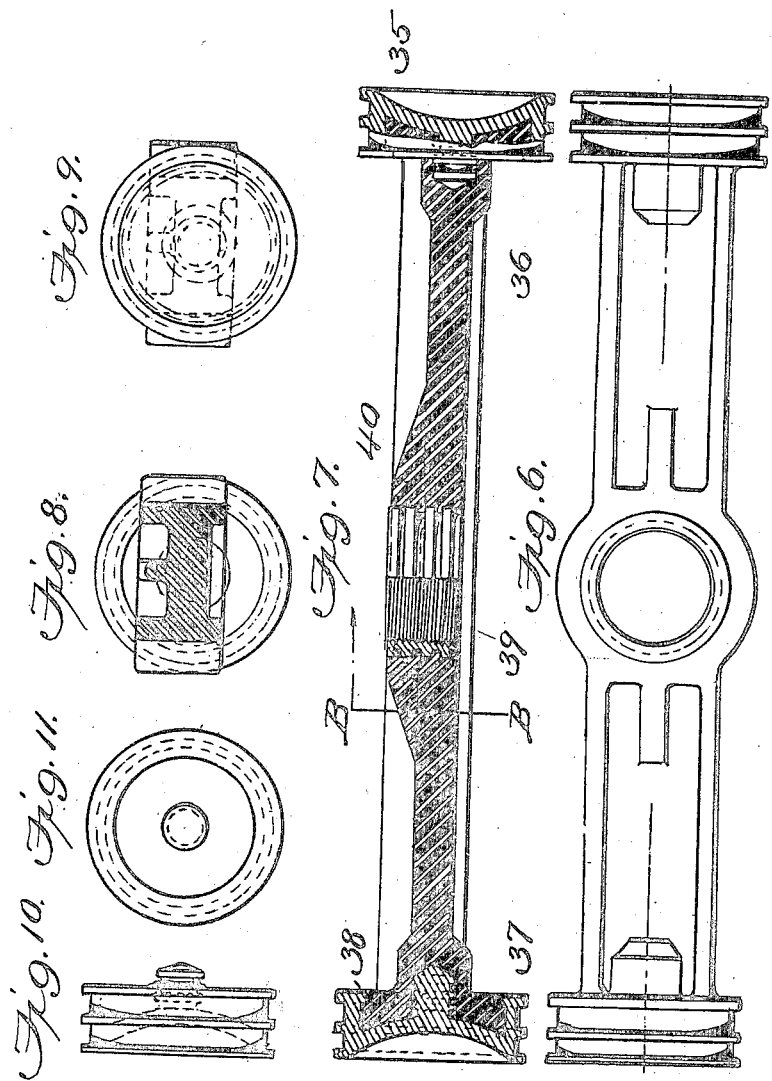

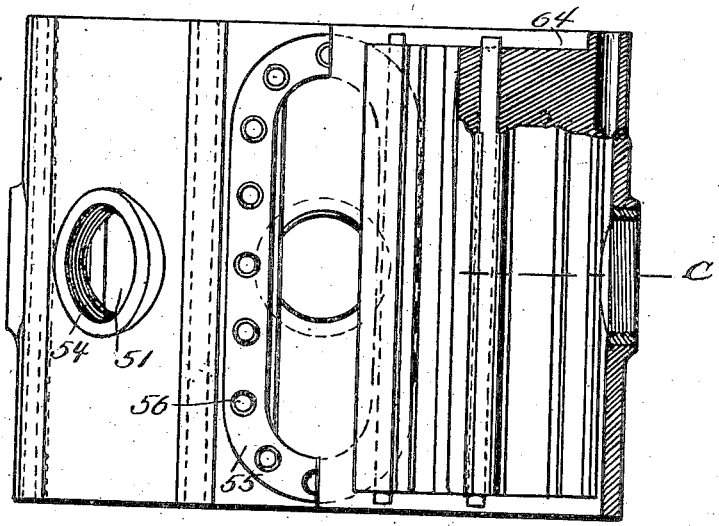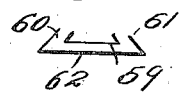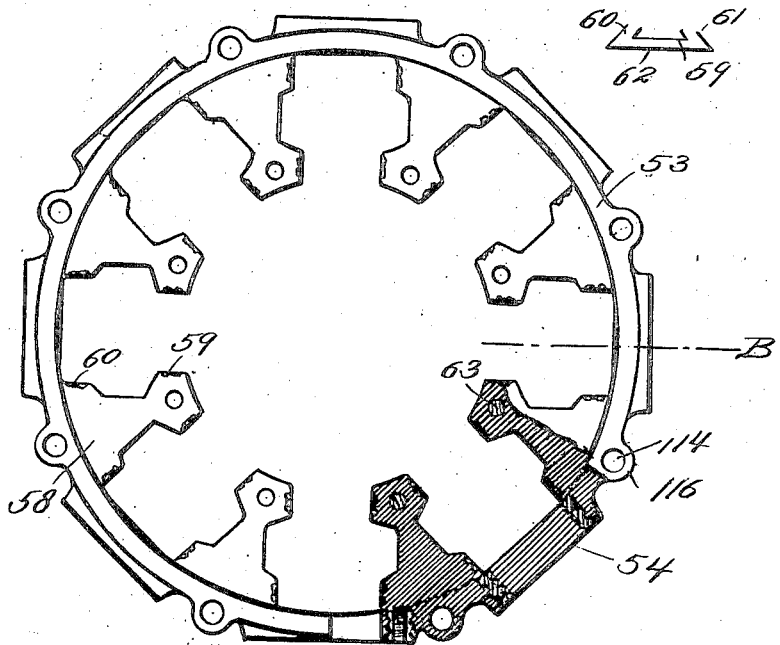

CHARLES DE LUKACSEVICS AND EDMUND LOFFLER, OF NEW YORK, N. Y.

INTERNAL-COMBUSTION ENGINE.

1,377,899. Specification of Letters Patent. Patented May 10, 1921.

Application filed April 30, 1920. Serial No. 377,986.

*To all whom it may concern:*

Be it known that we, CHARLES DE LUKACSEVICS and EDMUND LOFFLER, citizens of the United States, residing at New York, in the county of New York and State of New York, have invented new and useful Improvements in Internal-Combustion Engines, of which the following is a specification.

Our invention relates to internal combustion engines and more particularly to multiple cylinder engines having connected pistons reciprocating in oppositely disposed cylinders.

The invention further relates to an air cooled engine of the above mentioned type in which the improved valve mechanism assists in cooling.

The invention also provides a novel crank case and piston construction and arrangement of parts whereby extreme lightness, durability and economy in manufacture are obtained.

A further object of the invention is to eliminate side thrust on the pistons and connecting rod so as to obtain what may be termed a full floating piston.

It is also contemplated by our invention to provide a novel lubricating system embracing an oil pump having a variable stroke.

Other objects of the invention and novel details of construction and arrangement of parts will become apparent by consulting the specification wherein reference is made to the accompanying drawings.

In the drawings:—

Figure 1 is a sectional view of our improved engine structure. Fig. 1ª is a plan view of one of the pistons.

Fig. 2 is in part an end elevation and in part sectional taken at A, B and C of Fig. 1.

Fig. 3 is a plan view of the distributing mechanism, partly in section to show the worm drive and oil pump adjusting means.

Fig. 4 is a front elevation of the valve.

Fig. 5 is a section of the valve.

Fig. 6 is a plan view of our improved piston construction.

Fig. 7 is a sectional view of the same.

Fig. 8 is a sectional view on the line B—B of Fig. 7.

Fig. 9 is an end view of the piston construction.

Fig. 10 is a side elevation of the metal piston head insert and

Fig. 11 is a front view of the same.

Fig. 12 is a partial plan and sectional view at the line B, Fig. 13 of our improved crank case.

Fig. 13 is a plan elevation of the crank case partially in section at line C of Fig. 12.

Fig. 14 is an end view showing the adopted shape of guide bar insert.

The engine structure includes a crank case 10, oppositely disposed cylinders 11 and the cylinder heads which include annular valves 12, and a housing 13. These parts are secured in position by means of bolts 15 which extend through apertures 114, formed in projecting ribs 116 formed integral with the crank case composed of condensation product, which apertures are adapted to aline with apertures formed in similar ribs 16 interposed between adjacent cylinders, and with apertures formed in the ears 17 of the housing 13. Nuts 18 engage the threaded ends of the bolts 15 in order to secure the crank case, cylinder blocks and cylinder heads detachably together.

As shown, the improved engine construction consists of eight annularly arranged cylinders in each cylinder block, making a sixteen cylinder engine. The cylinder blocks are formed exteriorly, about the portions corresponding to each cylinder, with transverse fins 19 and interiorly with longitudinal ribs or fins 20 for the purpose of increasing the exposed surface area. The cylinder blocks are preferably formed of cast iron or aluminum and the wall of each cylinder is provided with a suitable aperture near its outer end for receiving a spark plug 21. The inner portions of the cylinder blocks form outwardly extending hubs 22 which are bored and counterbored to receive the inner engine shaft bearings 23, and the outer rings of ball thrust bearings 24. The inner retaining rings of these thrust bearing are located in annular recesses formed in each end of a drum 25 which is an enlargement of the engine shaft 26. The drum 25 is provided with a cam groove 27 through which the rectilinear movements of the pistons are converted into rotation of the engine shaft. In the case of a four-cycle engine, as herein shown, the arrangement is such that two complete reciprocations of each piston is required in order to produce one complete rotation of the engine shaft. The engine shaft is journaled in inner bearings 23 and outer bearings 28 mounted in frame members 29. The rear end of the engine shaft beyond bearing 28 is formed with a tapered portion 30 having a key 31 for receiving a flywheel and its corresponding keyway, the extreme end of the shaft being threaded for engaging a nut that securely holds the flywheel in place. The forward end of the engine shaft is provided with a worm gear 32 adapted to drive the timer and distributer mechanism 33. An oil pump of the plunger type 34 is actuated by cam 89 on the forward end of the engine shaft.

A piston construction embodying metal piston head inserts embedded in a connecting rod 36 of a phenol condensation product is utilized for the purpose of securing light and economical construction adapted to harmonize with the existing heat conditions within the cylinders. Each piston head is formed with a grooved stem 37 and annular flange 38 for embedding the piston head in the condensation material when the latter is in a plastic condition, and firmly gripping this material as it hardens. The piston rod 36 at its central portion is formed with a boss 40 in which is embedded the cylindrical metal insert 39 threaded interiorly, for receiving an enlarged head 41 threaded exteriorly and having a downwardly extending stud composed of two sections 42, 43 of reduced diameters. On the section 42 a guide roller 44 is mounted, while on the lower section 43 a cone shaped driving roller 45 is rotatably mounted and secured in position by means of the retaining screw 46. A roller thrust bearing 47 is inserted between the upper portion of driving roller 45 and the shoulder formed between the two sections 42, 43. The enlarged head 41 is provided on its upper portion with a threaded recess for receiving a stud 48 having a head 49 on which a guide roller 50 is rotatably mounted. The roller 50 is formed with transverse apertures adapted to aline with recesses in the enlarged head 41, for the application of a suitable wrench. The rollers 42 and 43 are of smaller dimension than the head 41 so that they may readily pass through the piston rod inserts 39. The crank case is provided with hand holes 51 normally closed by detachable covers 52, whereby the roller mechanism may be readily repaired or replaced. The drive roller 45 engages the driving cam groove 27 of the crank shaft and the guide rollers 47, 50 engage guide rails which are hereinafter described. All of these rollers are composed of softer material than the parts on which they bear so that the rollers take the wear instead of the more permanent parts of the engine, and can be readily replaced when sufficiently worn out.

The novel crank case is a die casting of a condensation product or like non-metallic substance that possesses the property of hardening or setting from a plastic condition. It comprises a cylindrical wall 53 having seven hand holes 51 therein arranged 45 degrees apart in which are embedded the threaded inserts 54 for receiving the detachable covers 52. The eighth place corresponding to the lower portion of the crank case is provided with a flat flange 55 having apertures therein provided with metal inserts 56 for the purpose of receiving the fastening devices for the oil pan or sump 57. The crank case is formed on its interior side with eight radially projecting guide bars 58 having upper and lower guide rail inserts 59, 60 embedded therein. These inserts are preferably of hardened tool steel and have a dove-tail section, such as illustrated in Fig. 14, so that they may firmly clamp the plastic bakelite forced between the projecting portions 60, 61 during the casting operation. The flat surfaces 62 are exposed and the guide rollers bear against these surfaces. In order to hold the protruding guide bars rigid, steel bars 63 embedded in their upper portions extend the entire length of the guide bars and project beyond the ends of the same and engage in corresponding holes in the ends of the opposite cylinder blocks. The body of the crank case is longer than the guide bars and recesses 64 are formed in the projecting portions for receiving and locating the extending flange 65 of the cylinder blocks. The oil sump 57 is provided with breather tube 66 and a tube 67 in which a float gage 68 is located.

The hubs 70 of the annular valves 12 are keyed to the engine shaft and the annular portion 71 of each valve is connected to the hub by means of the slanting spokes or ribs 72 which constitute fan blades for drawing air into the interior space of the cylinder blocks. The valves 12 are carried by and rotate with the engine shaft but their annular portions have gas tight engagement, but no wearing contact, with the cylinders and cylinder heads at 73, 74, 75 and 76, the corresponding surfaces of the valve being indicated at 73', 74', 75' and 76' (Fig. 5). The annular valve is formed with the annular inlet and exhaust chambers 77 and 78 respectively which are separated by the wall 79. The inlet chamber 77 communicates with an inlet port 80 which passes transversely through the valve so that the suction of the cylinders may be exerted directly on the carbureter 81 through the inlet passage in the cylinder head 13, and the connecting intake manifold 82, and the incoming gases will mix with the gases in the inlet chamber 77 of the valve which have been subjected to the heat of the exhaust gases. The peripheral exhaust chamber 78 communicates with the cylinders through the lateral exhaust port 83, which is of considerable extent so that at least one of the cylinders is always exhausting through the valve when the engine is in operation. The peripheral exhaust chamber 78 discharges into annular exhaust passages 85 that communicate with exhaust collecting chambers 86 to which the exhaust pipes 87 are connected.

The oil pump 34 is provided with a plunger 88 that is moved on its working stroke by a cam 89 secured to the engine shaft. A spring 91 forces the plunger on its return stroke. A lever 92 having a projecting lug 93 is pivoted to the gear casing 94 by means of a screw 95 and this lever may be connected to the throttle lever 96, if desired, so that by interposing the lug 93 in the path of the pump plunger at various points the return of the plunger may be limited and the stroke of the oil pump adjusted according to the position of the throttle valve. A pipe 97 leads from the oil sump to the connection 98 of the oil pump, the other connection 99 being connected to a distributing pipe leading to the engine.

The firing order of the engine is such that two cylinders, one in each set 90° apart are fired simultaneously so that the forces so generated tend to cushion one another. The inlet ports of the valves are as wide as the diameter of each of the cylinders and provide a means whereby the charge may rapidly enter the cylinder after being heated in the annular inlet chamber. This central annular inlet chamber affords a uniform distribution of the incoming charge to any of the cylinders located within the cylinder block.

The guide rails 59, 60 above and below the piston centers engaging the guide rollers of the piston rod guide the pistons in their reciprocations thereby removing side thrust from the piston heads and cylinders, and permitting the pistons to reciprocate freely, with a rolling friction substituted for the sliding friction between the pistons and cylinders, ordinarily created by such side thrust. The distortion resulting from such side thrust is also eliminated so that the piston rings may maintain perfect sealing conditions. The steel rods embedded in the condensation product forming the guide rails take the stress in the same manner as reinforcing rods in concrete and prevent the guide rails from cracking as well as adding rigidity thereto. The hardened metal inserts of the rails take the wear on the contacting rollers so that this integral structure of the crank case may be regarded as permanent.

The piston construction including a condensation product with its metal piston heads permit the latter to assume the shape of the cylinders which may vary under different heat conditions thus eliminating any danger of binding, and providing in conjunction with the guide rails, a freely floating piston subject only to the longitudinal stress imparted by the explosion of the combustible gases.

The ribs 72 of the valve form fan blades which impel the air against the ribs 20 for cooling purposes.

The construction of the crank case and pistons with a condensation product provides a light, simple and inexpensive construction since after the die castings are completed no costly machine work is necessary.

We claim:—

1. In an internal combustion engine, a crank case of non-metallic material such as a phenol condensation product, a metallic cylinder block thereon, an engine shaft journaled in said cylinder block and pistons in the cylinders of said block for driving said shaft.

2. In an internal combustion engine having oppositely disposed cylinder blocks, a crank case of a condensation product, an engine shaft journaled in said cylinder block, pistons in the opposing cylinders of said blocks rigidly connected together and means for converting the reciprocating movements of said pistons into rotary motion of said engine shaft.

3. In an internal combustion engine having oppositely disposed cylinder blocks with opposing cylinders formed therein, an engine shaft journaled in said cylinder blocks, a crank case formed of relatively soft material, pistons adapted to reciprocate in said opposing cylinders, a connecting rod rigidly connecting said pistons, means mounted on said connecting rod and engaging said engine shaft for imparting rotary motion thereto, and bars integral with said crank case having strips of wear resisting material secured thereto coacting with said means for guiding said connecting rod and pistons during their reciprocatory movements.

4. In an internal combustion engine having oppositely disposed cylinder blocks with opposing cylinders formed therein, an engine shaft having a cam groove, a crank case of relatively soft material, pistons adapted to reciprocate in said opposing cylinders, a connecting rod rigidly connecting said pistons, means mounted on said connecting rod and engaging said cam groove for imparting rotary motion to said engine shaft, and guide bars integral with said crank case having reinforcing rods embedded therein, said guide bars coacting with said means for relieving said pistons and connecting rod of side thrust.

5. In an internal combustion engine having oppositely disposed cylinder blocks with alining cylinders formed therein, an engine shaft having a cam groove, a crank case, piston heads adapted to reciprocate in said cylinders, a connecting rod of a phenol condensation product to which said piston heads are firmly attached, means mounted on said connecting rod and engaging said cam groove for imparting rotary motion to said engine shaft and guide bars in said crank case coacting with said means for relieving said piston heads and connecting rod of side thrust.

6. In an internal combustion engine, a crank case, an engine shaft, a cylinder having a piston and connecting rod reciprocating therein, bars secured to said crank case having guide rails disposed on opposite sides of the axis of said connecting rod, means carried by said connecting rod for engaging the engine shaft and imparting rotating motion thereto, and rollers removably mounted on said connecting rod adapted to contact with said guide rails.

7. In a multiple cylinder internal combustion engine, an engine shaft, a valve mounted on said shaft controlling the functions of the cylinders, and ribs formed on said valve causing a circulation of cooling air on the engine cylinders when the valve is in operation.

8. In an internal combustion engine having a crank case with oppositely disposed cylinder blocks mounted thereon, an engine shaft, inner bearings in said cylinder blocks for said shaft, valves secured to said engine shaft controlling the functions of the engine cylinders, and fan blades formed on said valves causing a circulation of cooling air about said inner bearings when the valves are in operation.

9. In an internal combustion engine having a crank case with oppositely disposed cylinder blocks mounted thereon, an engine shaft, inner bearings for said shaft in said cylinder blocks, said cylinder blocks having cylinders formed therein, longitudinal ribs formed on said cylinder blocks about said bearings and along the exterior of said cylinders, valves secured to said engine shaft controlling the functions of said cylinders, and fan blades included in said valve structure for forcing cooling air against said ribs when the valves are in operation.

10. In an internal combustion engine having oppositely disposed cylinder blocks including a plurality of alined cylinders, inner bearings mounted in said cylinder blocks, frame members, outer bearings mounted in said frame members, an engine shaft journaled in said bearings, and valves controlling the functions of said block of cylinders mounted on said shaft between said inner and outer bearings.

In testimony whereof we have hereunto set our hands in presence of two subscribing witnesses.

CHARLES DE LUKACSEVICS.
EDMUND LOFFLER.

Witnesses:
HARRIET ROBINSON,
JOHN WOOD.